Oct. 24, 1939.　　　　E. G. FASSEL　　　　2,177,135
PHOTOGRAPHIC RECORDING EQUIPMENT
Filed Dec. 17, 1936　　　6 Sheets-Sheet 2

INVENTOR
Elgin G. Fassel
BY
Wheeler, Wheeler and Wheeler
ATTORNEYS Oct. 24, 1939.                    E. G. FASSEL                    2,177,135
                         PHOTOGRAPHIC RECORDING EQUIPMENT
                           Filed Dec. 17, 1936        6 Sheets-Sheet 6

Inventor
Elgin G. Fassel
By Wheeler, Wheeler and Wheeler
Attorneys

Patented Oct. 24, 1939

2,177,135

UNITED STATES PATENT OFFICE 2,177,135

PHOTOGRAPHIC RECORDING EQUIPMENT

Elgin G. Fassel, Milwaukee, Wis.

Application December 17, 1936, Serial No. 116,326

22 Claims. (Cl. 88—24)

My invention relates to improvements in photographic recording equipment and methods, with particular reference to the production of either temporary or permanent records at minimum expense.

A primary object of my invention is to provide satisfactory means for protecting a filing system against loss when documents are temporarily removed from their files.

In a filing system from which thousands of documents are being daily removed upon requisitions by those who desire to examine them, there is constant danger of the loss of one or more documents from any group so removed.

It is my object to provide means whereby duplication of files by production of photographic miniatures is facilitated, the identification of the miniatures with the originals is also facilitated, and whereby the recording of the time of duplication is made automatic, and whereby the cost of storage for the duplicates is reduced to a minimum.

It is my object to not only provide means for producing and permanently keeping duplicate files in miniature, but to also provide for producing duplicate records for temporary storage in connection with each transaction involving the removal of a document or a group of documents from the files, and to do so in such an expeditious manner and at such a small expense that the records may be destroyed when all of the documents involved in such transaction have been returned to the files.

My improved method and the apparatus used in connection therewith is peculiarly adapted to the requirements of banks and insurance companies, where many documents serve a temporary purpose, and where documents contain endorsements on both sides,—often placed thereon at different times,—and where records of both sides of the document require to be inseparably associated and identified as relating to the same document at the recorded time.

More specifically, my objects are to provide means for obtaining a record of both sides of a document and of the time when it was withdrawn from the files, together with any other desirable data whereby it may be traced to its destination or reproduced, if lost;—to provide means whereby such records may be photographically made upon a continuously moving film while the documents are being advanced at a corresponding rate of speed across narrow fields of vision, or exposure, defined by viewing chamber openings or slots through which the images may be projected to the lens of a continuous camera by suitably disposed reflectors;—to provide means whereby the reflectors and also the openings through which the upper and lower surfaces of the document are to be progressively exposed may be offset in such a manner that rays of light illuminating one surface of the document will not pass through the document into the photographic field of the other side;—to provide means whereby such moving documents may be adequately supported and guided in the photographic fields without allowing the supporting elements to produce shadow lines or marks on the photographs;—and to provide means whereby the movement of the film across the "eye" of the camera may be automatically stopped when a document is not present in the photographic fields, and resumed the instant a document starts across such fields.

It is also my object to provide photographic means for recording, upon a single section of film, the withdrawal of a group of documents from their files and the time of such withdrawal, together with a complete record of both sides of all the documents in the group, photographically associated and identified as having constituted members of the group at the time the photographs were taken, even though such documents may have been temporarily taken from different files, the pictures of each document in the record being correlated with each other and with those of all other members of the group by the same mechanism which produces the record.

A further object is to provide an improved automatic counting mechanism subject to direct control by the documents fed through the photographic field.

In the drawings:

Figure 12 is a face view of the clock dial and associated indicators.

Like parts are identified by the same reference characters throughout the several views.

The embodiment of my invention as illustrated in the drawings and hereinafter described is designed with particular reference to the purpose of making photographic records of documents, such, for example, as the cards employed by insurance companies for keeping records of policies. These cards may be frequently withdrawn from the files upon requisitions issued by employees of the company. In some instances they are quickly returned, and in other instances the withdrawn cards, or some of them, may be retained for prolonged periods.

The illustrated embodiment of my invention may be placed in the filing department, and when cards are withdrawn by the filing clerks they are fed across a table or platform 20 (Figure 2), through a feedway 21 which extends through the wall 22 of a viewing chamber and guides the cards between a set of upper and lower feed rollers 25 and 26. These feed rollers deliver the cards across photographic fields represented generally, in Figure 2, by slots 28 and 29 in upper and lower plates 30 and 31 disposed between the feed rollers 25 and 26 and a corresponding set of outfeeding rollers 33 and 34. Rollers 33 and 34 deliver the cards through a feedway 35 which leads through the rear wall 36 of the viewing chamber.

Figure 1:
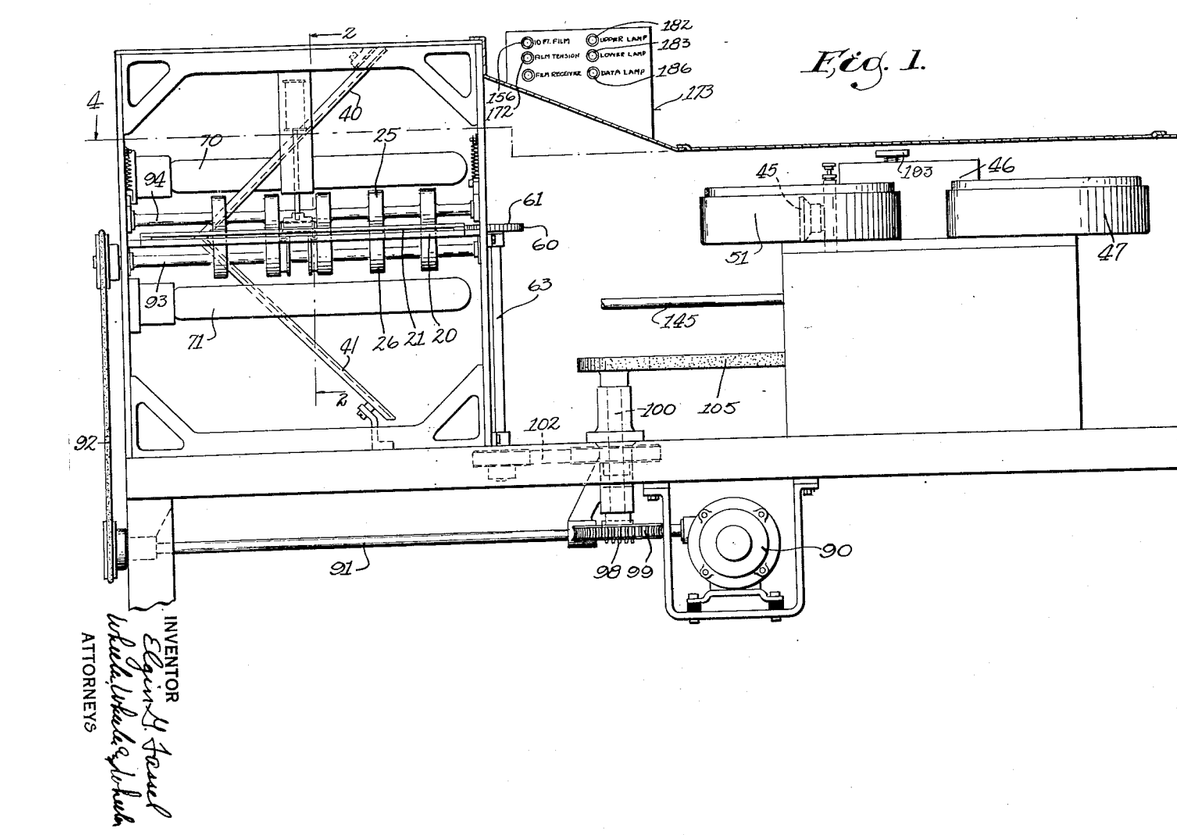
Figure 1 is an elevation of my improved equipment as seen from the infeeding side, front wall omitted.
Figure 4:
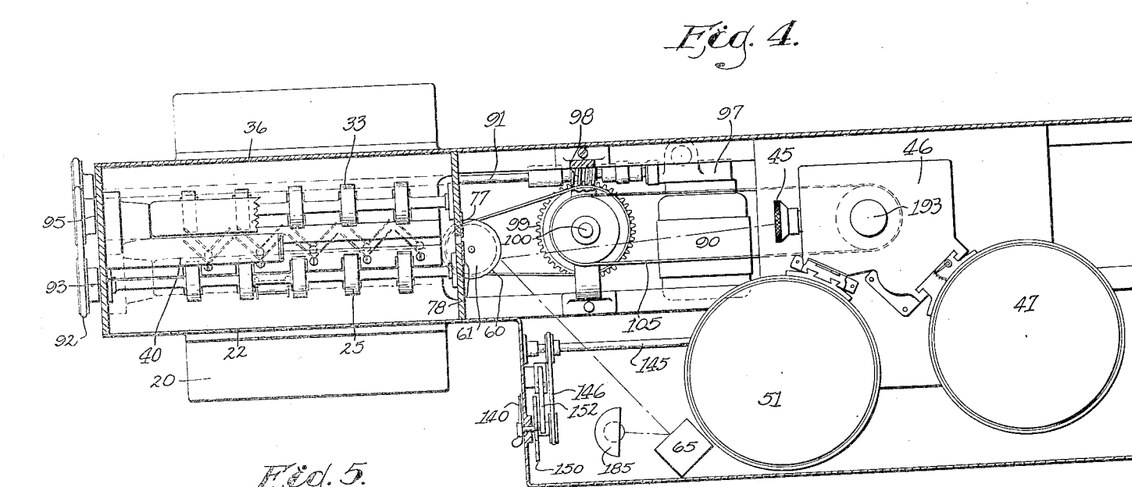
Figure 4 is a plan view of the feed rollers, driving assembly, and associated parts, drawn generally to line 4—4 of Figure 2.
Figure 6:
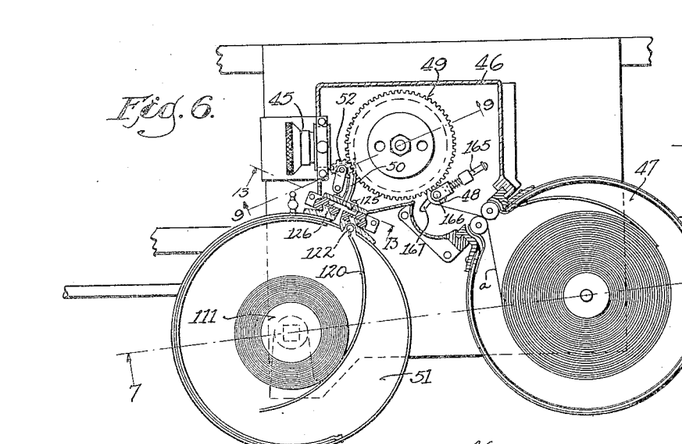
Figure 6 is a plan view of the camera assembly, with portions of the casing in horizontal section, and with the covers removed from the film magazines.

As the cards cross the slots 28 and 29, their upper and lower surfaces are progressively exposed and obliquely spaced reflectors 40 and 41 reflect the images to the lens 45 of a camera, the body or casing 46 of which is illustrated in Figures 1 and 4. The camera is a continuous camera, provided with power driven means for continuously withdrawing film from a magazine 47, (Figure 6). The film is drawn around a guiding and tensioning roller 48, from which it passes around a film actuating turret 49, and thence through a guideway 50 into a receiving magazine or drum 51. The film may be held to the turret by means of a roller 52, located on the outfeeding side and cooperating with the turret 49.

Figure 9:
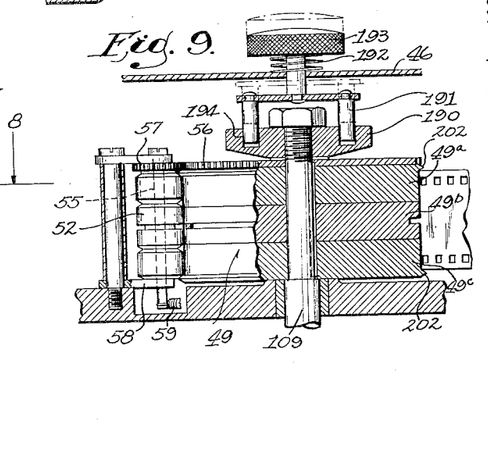
Figure 9 is an enlarged sectional view drawn to line 9—9 of Figure 6.

As shown in Figure 9, the roller 52 may be driven from a gear wheel 56 carried by the turret 49 and a pinion 57 carried by the shaft 55. Shaft 55 is supported by swinging carrier arms 58, tensioned by a suitable spring 59 (Figure 9).

As the film passes about the turret it is exposed to light rays entering through the lens 45. The images reflected by the lower mirror 41 will be inverted and printed upon the upper portion of the film, whereas the images reflected by the upper mirror 40 will be correspondingly inverted and printed upon the lower portion of the film. The rays of light passing horizontally through the center of the lens will be received from reflectors 60, of which an annular series is carried by the wheel 61. The wheel 61 revolves horizontally in a plane which includes the angle formed by the mirrors 40 and 41, or, more particularly, by frames which support these mirrors. The reflecting surfaces of the mirrors 40 and 41 terminate at a suitable distance from the apex of said angle so that the images reflected by the respective mirrors will be imprinted upon the film in spaced relation to each other, thus leaving a central zone of film between the two photographs to receive photographs of a clock and other data reflected to the camera at definite intervals by the reflecting wheel 61.

The reflecting wheel 61 may be conveniently termed the indexing wheel. It is mounted upon the upper end of a vertical shaft 63 (Figures 1 and 3), which is driven, as hereinafter explained, from a source of power common to the card infeeding rollers 25 and 26 and the film feeding turret 49.

Suitable time indicating and indexing elements located in housing 65 (Figures 4 and 12), are exposed in a position to be reflected by the time indexing wheel 61, and their images are periodically directed into the lens as each reflecting surface of the wheel arrives at a proper position for projecting the image through the central horizontal zone of the lens.

Figure 2:
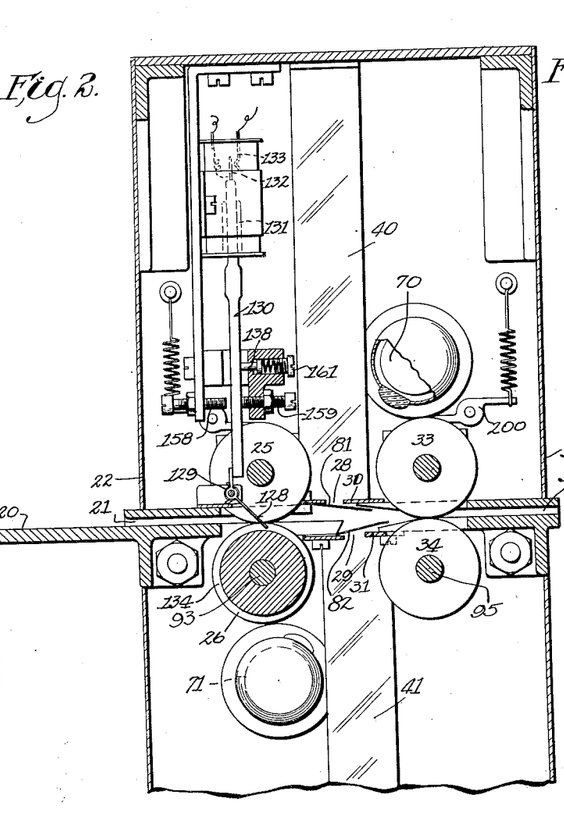
Figure 2 is a sectional view drawn generally to line 2—2 of Figure 1.

The documents or other objects delivered through the viewing chamber may have their top and bottom sides illuminated without blending the images of recorded matter appearing on opposite sides of the documents. This is accomplished by staggering the viewing slots 28 and 29, as best shown in Figure 2, whereby rays of light may pass through these slots from either side in a direction to be intercepted by the screens or partition members 30 and 31. I may employ a tubular lamp 70 (Figures 1 and 2) to illuminate the upper surface of the document. This lamp is preferably located substantially above the outfeeding roller 33 so that light therefrom will pass obliquely through the slot 28 in the general direction of the lower roller 26, below which I place a similar lamp 71, from which rays of light pass through the slot 29 in the general direction of the upper outfeeding roller 33. Therefore, the illuminated zone on the upper face of the document will receive substantially no light from the lamp 71, and the illuminated portion of the upper surface may be reflected to the camera by the mirror 40 as a clear or sharply defined image. Similarly, and for the same reason, a clear image of the lower surface will be simultaneously reflected by the mirror 41.

Inasmuch as the cards are moving continuously, successive zones may be reflected by the mirrors 40 and 41 through the slots 75 and 76 between an upper set of shutters 77 and 78 and a lower set of similar shutters 79 and 80 in vertical planes offset from those of the upper shutters in correspondence with the offset relation of the slots 28 and 29 in the document guiding shields. The images may thus be continuously imprinted upon a traveling film with uniform time exposure for every portion of the face of the document, the principle of the so-called panoramic camera being involved.

To prevent any document from being deflected through either of the viewing slots 28 or 29, I employ sets of wires 81 and 82 which are secured to the receiving sides of the partition members or screens 30 and 31. These wires project obliquely and convergently across the slots 28 and 29 and guide the advancing edge of the card between the outfeeding rollers 33 and 34. By obliquely positioning these wires across the slots, the light rays from any given portion of the document are intercepted by each wire for only a short portion of the time of exposure, and no images of the wires appear upon the photographs.

From the foregoing description, it will be understood that the images from the upper and lower sides of the continuously moving document will be panoramically imprinted upon the lower and upper side portions of the continuously moving film and the photographs of the document thus produced on the film will be opposite each other. Between them, at intervals, will be photographs of the data projected by the reflectors on the index wheel 61.

The driving mechanism is so organized that the rate of film travel will be proportionate to the rate at which the documents move. The relative rates of travel will depend upon the focal distance and the corresponding degree of reduction in the size of the photograph as compared with the size of the document. Therefore, each photograph will have been completed by the time the document has crossed the fields of vision defined by the screens 30 and 31, with their slots 28 and 29.

To definitely bring about correspondence between the rate of document travel and the rate of film travel with reference to the focal distance of the film from the lens, I may employ a common driving motor 90 (Figure 1) which drives the lower set of infeeding rollers through a shaft 91, a belt 92, and the shaft 93 which supports the lower set of infeeding rollers 26. The shaft 94 which supports the upper set of infeeding rollers 15 may be allowed to run idle. But it is desirable to positively drive the outfeeding roller 34, and therefore the belt 92 is utilized to drive the shaft 95 upon which these rollers are mounted. The shafts 91, 93 and 95 are provided with suitable pulleys over which the belt 92 is passed, as clearly indicated in Figures 1 and 4.

The motor is operatively connected with the shaft 91 by suitable transmission and reduction gears located in an extension of the motor housing 97. This gearing is not illustrated, but may be understood to be of a common type selected with reference to the speed to be transmitted.

Figure 7:
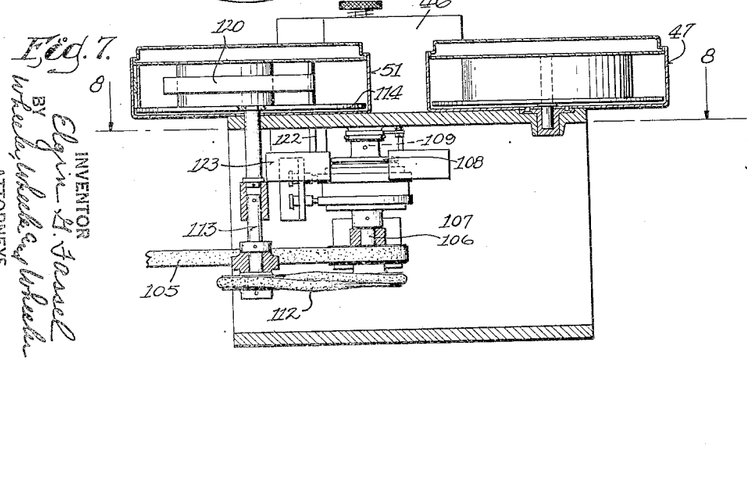
Figure 7 is a vertical sectional view drawn to line 7—7 of Figure 6.

Shaft 91 is provided with a worm gear at 98 which drives the worm wheel 99 (Figure 1). This worm wheel 99 is mounted upon a vertical shaft 100, from which the time indexing wheel 61 may be driven by a belt 102 and the vertical shaft 63. From shaft 100, a belt 105 drives vertical shaft 106 (Figure 7), to which the driving member 107 of a magnetic clutch is fixed. A driven clutch member 108, mounted on an aligned shaft 109, transmits motion to the turret 49 which serves as the film driving member. From shaft 106 motion may be transmitted through the crossed belt 112 to a vertical shaft 113 which extends into the receiving magazine 51 and carries a disk 114 upon which the lower edge of the film may rest. The friction tends to cause the film to coil in the receiving magazine, as will now be explained.

The film a, as drawn from the roll in the supply magazine 47, tends to rewind in the same direction, but it is held to the turret 49 by the rollers 48 and 52. The roller 52 guides the film into the passage or guideway 50 leading to the receiving magazine 51, and upon entering this magazine the film is free to rewind in the space between an arcuate movable shield 120 and the side of the magazine through which the film enters from the guideway 50. It may be aided by a winding drum 111 having a kerf or equivalent means for engaging the end of the film.

As above stated, the lower edge of the film rests upon the revolving disk 114. The latter turns in the direction indicated by the arrow in Figure 6, and aids in re-coiling the film. The shield 120 yields under the pressure of the enlarging coil and is progressively pushed backwardly as the diameter of the coil of film increases.

Figure 15:
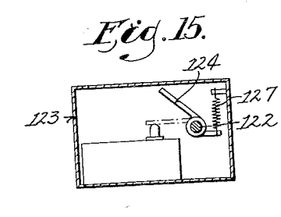
Figure 15 is a similar view of a switch associated with the receiving magazine.
Figure 16:
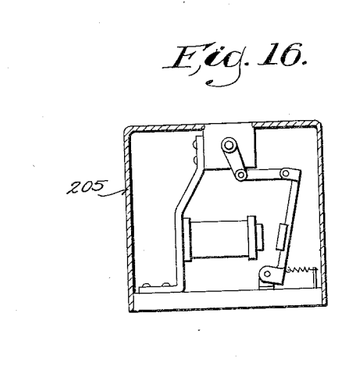
Figure 16 is a conventional illustration of an electrically operated device or tally for counting the documents as they are being fed into the photographic field.
Figure 18:
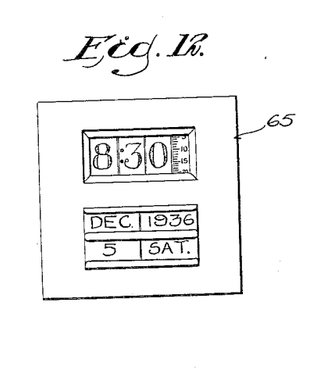

The pivot shaft 122, to which the shield 120 is attached, extends through the bottom of the magazine beyond the periphery of the disk 114 and enters a switch box 123 (Figure 15). It preferably carries a switch arm 124, and as hereinafter explained, this switch may control a signalling circuit to warn the operator when the receiving magazine has been substantially filled.

When the receiving magazine has been sufficiently filled, the operator stops feeding cards into the viewing chamber, and after the card traversing that chamber has been completely photographed, film feeding is automatically stopped pending severance of the completed roll of film and its removal from the receiving chamber.

Figure 13:
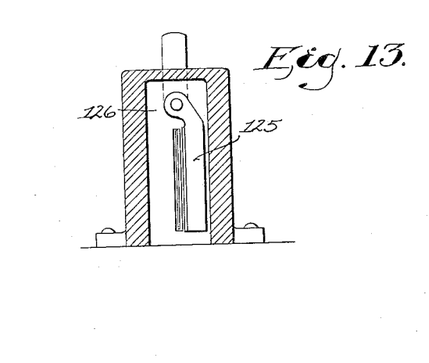
Figure 13 is an enlarged detail view of the cut-off knife and associated parts, drawn to line 13—13 of Figure 6.

A film cutting blade 125 (Figures 6 and 13), is mounted for operation transversely of the feedway 50 in a slot 126. When the completed roll of film has been removed from the receiving magazine the shield 120 will be urged by a spring 127 to its normal initial position. When card feeding is resumed, the electromagnetic clutch will automatically be energized and film feeding resumed, as now to be explained.

The electromagnetic clutch is dependent for film feeding operation upon the presence of a document in the viewing chamber or between its infeeding rollers. A bell crank has a finger-like arm 128 (Figure 2), held by a spring 129 normally across the path of the infeeding cards, with an upwardly projecting arm engaging the lower end of a switch arm or lever 130. This lever is mounted in a slightly flexible holder 131, and its upper end carries an electrode 132 adapted for contact with a terminal 133 in the circuit of the electromagnetic clutch. The bell crank finger 128 may enter an annular channel 134 in the roller 26. But when a card is fed into the viewing chamber, arm 128 is lifted by the card. This permits the switch to automatically close the circuit by contact of electrode 132 with terminal 133, thereby energizing the magnetic clutch if its circuit is otherwise closed.

Operation of the above described major portions of my equipment will now be briefly reviewed as follows.

With the film in position for taking photographs and the motor in operation, the cards to be photographed will be fed successively across table 20 into the viewing chamber. The first card lifts the bell crank arm 128 and retracts its upper arm from the lower end of switch arm 130 to allow the upper end of that arm to be swung by a spring actuated plunger 138 to bring its electrode 132 into contact with terminal 133, the flexible holder 131 serving as a fulcrum. There is already a circuit through the lamps 70 and 71, but this connects up the energizing circuit of the electromagnetic clutch (Figure 7), whereby its driven member 108 is made to actuate the turret 49 and feed the film continuously across the path of the light rays entering through the lens. The exposed portions of the film pass to the receiving magazine 39, as above explained. Cards may thus be photographed in succession.

The operator should not feed the cards edge to edge. Therefore I employ a condenser 139 in the energizing circuit of the electromagnetic clutch to delay de-energization when switch arm 130 is released by the bell crank in the absence of a card underneath finger 128. The panoramic photographing of one card may thus proceed until completed, and if the next card has then arrived under finger 128, film feeding may be continuous, notwithstanding a brief interruption of the clutch circuit by a momentary separation of electrode 132 from terminal 133.

Certain ancillary features will now be described.

Figure 5:
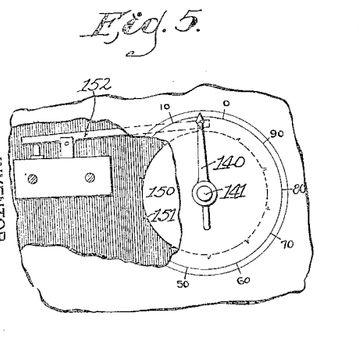
Figure 5 is a detail of an indexing structure for registering the number of feet of film exposed.

To measure and record the number of feet of film passing through the camera, I employ a metering index finger or pointer 140 (Figure 5), which is carried by a shaft 141, driven from the shaft 109, (Figure 8), by means of a belt 142, worm shaft 143, worm wheel 144, shaft 145, and belt 146 (Figure 4), the driven pulley of which is mounted upon said shaft 141.

Shaft 141 carries a metering wheel 150 provided with projections 151 at suitable intervals, spaced to represent a predetermined length of film. This wheel turns at such speed that one of the projections will be brought into engagement with a strike finger 152 at intervals represented by the passage of a certain length of film through the camera.

In the construction illustrated, the gear reduction is such that a projection 151 will engage the strike arm of lever 152 upon the passage of each ten feet of film through the camera. Lever 152 is spring actuated and adapted to yield when struck by one of the projections 151, thereby closing an electrical circuit through a lamp 156, (Figure 1), which momentarily flashes and signals completion of the delivery of the measured portion of the film through the camera.

While the motor circuit may be interrupted whenever film feeding is to be temporarily stopped, yet in the embodiment of my invention as illustrated in the drawings, it is possible to operate the motor continuously when card feeding is temporarily interrupted, for in that event the bell crank finger 120 will drop and allow switch members 132 and 133 to separate, thus automatically interrupting the circuit of the magnetic clutch and stopping the rotation of the film feeding turret 49.

The switch mechanism with which the arm 130 is associated is of a well-known type in which adjusting screws 158 and 159 regulate the field of movement of the arm 130, and the spring of plunger 138 may have its tension adjusted by a screw 161 so that it will move arm 130 to circuit closing position when that arm is not held retracted by the bell crank spring 129 with its greater mechanical advantage.

Figure 8:
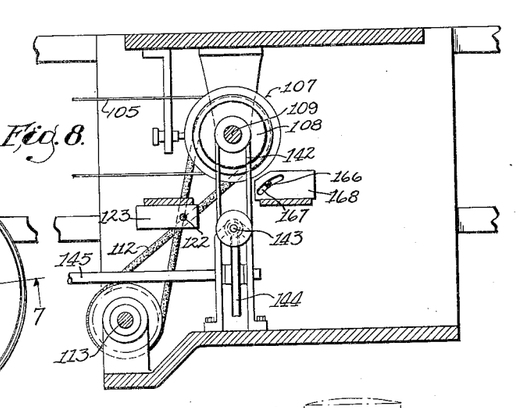
Figure 8 is a view in horizontal section drawn to line 8—8 of Figure 7.
Figure 14:
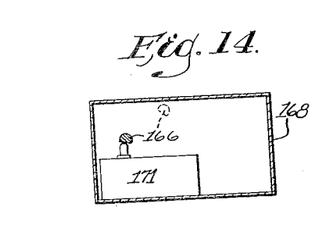
Figure 14 is a detail sectional view of the tension controlled switch.

In Figure 6 I have shown the tension roller 48 mounted on the forked end of a spring actuated plunger rod 165. The roller shaft 166 extends through an arcuate slot 167 in a switch box 168 (Figure 8). When the film breaks or the supply becomes exhausted, or if for any other reason the tension of the film ceases to hold the roller 48 in the position in which it is shown in Figure 8, the spring actuated plunger 165 forces the roller downwardly,—its shaft traveling downwardly in the arcuate slot 167 until it operates a switch 171 in the switch box 168 (Figures 8 and 14), and connects up the circuit of a signal lamp 172, which, with the lamp 156 and other signal lamps hereinafter referred to, are mounted upon an instrument board 173 (Figure 1).

In Figure 15 the shaft 122 of the receiver film guide is shown extended from the receiving magazine into a switch box 123, and provided with a contact arm adapted to engage a terminal to connect up the circuit of a signal lamp 179 on said instrument board.

The viewing chamber tube lamp 70 has associated means for connecting up the circuit of the signalling lamp 182, if the tube lamp should burn out or its circuit become interrupted. The tube lamp 71 has similar means for connecting up a circuit of the signal lamp 183, and a lamp 185 for illuminating a clock dial and other data in the housing 65 may also have an associated signal lamp 186.

As hereinafter explained, when describing the electrical diagram, operation of any illustrated signal other than the metering signal 156 will be concurrent with an automatic interruption of the motor circuit.

Therefore, when either of the lamps 70, 71 or 185 ceases to function, its associated signal lamp 181, 183 or 186 will be lighted. The lighting of the signal lamp, illustrated on the instrument board through the lamp 156, will advise the operator to stop feeding cards into the viewing chamber, whereby film feeding automatically ceases, as above explained, until the operator has again placed the machine in running order. The lighted signal lamp will advise him what is necessary to be done.

Films are at present being manufactured in two standard widths, viz.—a 35 mm. film and a 16 mm. film. As shown in Figure 9, the turret is adjusted to the requirements of the 35 mm. film, but it will be observed that the turret comprises a series of disks 49a, 49b, and 49c, which are keyed to the driving shaft 109 and may readily be removed. By removing and replacing the disks with the upper and lower disks reversed, their ribs or projections 202 may be utilized to guide the narrow film and hold it to the periphery of the central control disk 49b.

To provide for manual turret operation when adjusting a new supply film to the turret or re-engaging the broken end of a film, I provide the upper end of the turret shaft 109 with a nut 190, operable by means of a suitable tool 191 of the spanner wrench type. This tool may be normally supported in an inoperative position by a spring 192 coiled about its shank at the outer side of the wall of the casing.

The shank has an operating knob 193 which may be pressed inwardly and rotated to engage the wrench in suitable sockets 194 in the nut 190, whereupon the turret may be manually rotated. Access to the turret may be had in any ordinary manner, it being customary to provide turret casings with a removable section to permit such access.

Figure 3:
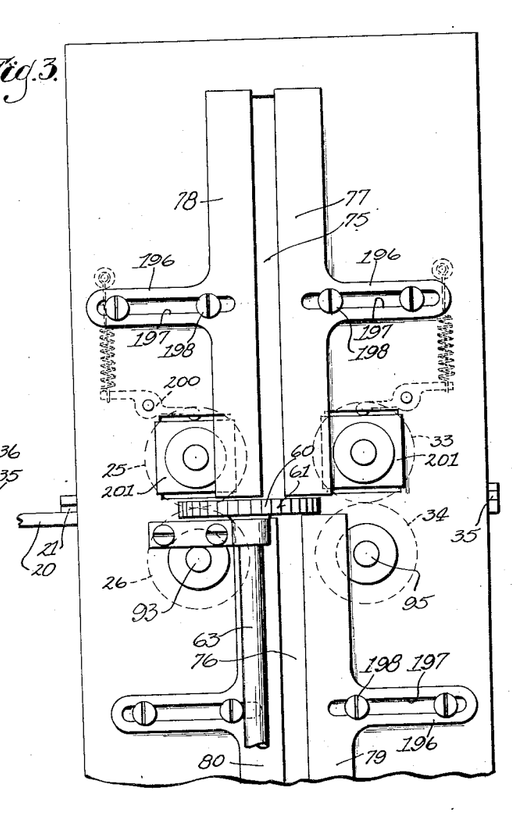
Figure 3 is an elevational view of the panoramic shutters and associated parts as viewed from the side occupied by the camera.

Referring to Figure 3, it will be observed that the panoramic shutters 77 to 80, inclusive, are each equipped with horizontally extending supporting arms 196 which are provided with slots 197 to receive adjusting screws 198. In this manner each shutter is independently supported and capable of adjustment independently to regulate the width and location of the space through which the images may be reflected to the camera.

In the same view I have illustrated means for tensioning the upper infeeding roller 25 and the upper outfeeding roller 33 by means of spring actuated levers 200, each having one arm in pressure engagement with a bearing box 201 for the associated roller supporting shaft.

To automatically count the documents as they are being fed into the viewing chamber, I employ an electromagnetic counter or tally 205, the circuit of which is controlled by the document actuated bell crank finger 128 through the switch arm 130 and its electrode 132. By feeding the documents into the viewing chamber in spaced relation to each other, contact finger 128 may be allowed to momentarily drop after the passage of each document, thereby momentarily interrupting the circuit of the electromagnetic clutch 107, and correspondingly interrupting the circuit of the electromagnetic counter 205, these circuits being illustrated in the electrical diagram, Figure 10, which will now be described in detail.

Figure 10:
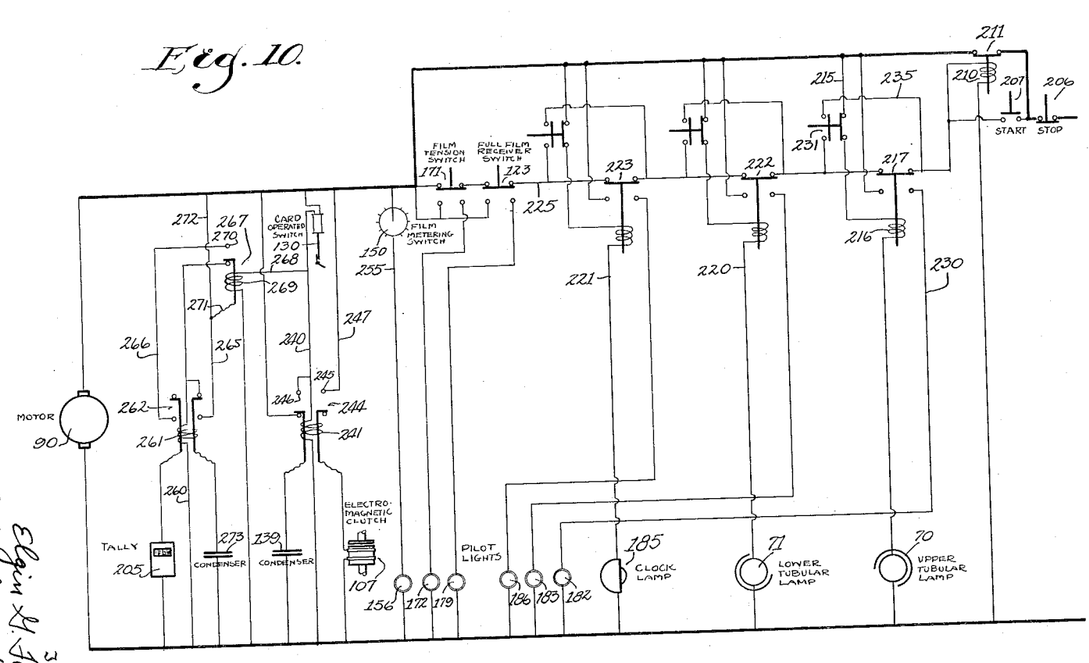
Figure 10 is a wiring diagram, illustrating one of various possible systems for electrically controlling the operation of the equipment, and providing signals when attention by the operator is required.
Figure 11:
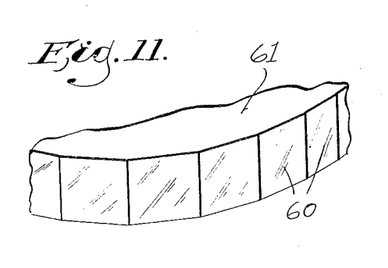
Figure 11 is a detail showing a fragment of the index reflector wheel, in perspective.

In Figure 10 the motor circuit is indicated by relatively heavy lines and may be normally connected with a source of supply by the manually operated stop switch 206. When the switch 206 is closed the motor circuit may be connected for motor operation by a push button switch 207, which momentarily closes a shunt circuit through the solenoid winding 210 and actuates the relay switch 211 to close the motor circuit. Thereupon switch 207 may return to normal open position since the solenoid winding 210 will continue to receive current from the shunt circuit of lamps 70, 71, or 185.

The shunt circuit of lamp 70 is through line 215 and solenoid winding 216. When energized, the solenoid automatically closes the switch 217. The similar shunt circuits of the lamps 71 and 201 will be correspondingly established through the lines 220 and 221, thus closing the switches 222 and 223. The switches 171 normally bridge gaps in the auxiliary line 225 which may be completely connected up by the solenoid actuated switches 217, 222, and 223, whereby, when the relay switch 211 is closed the winding 210 of its solenoid will be kept energized after the push button switch 207 has returned to a normal open position.

Under these conditions lamps 70, 71 and 185 will be lighted, but if the circuit through one of these lamps should be interrupted, its associated solenoid would be deenergized, thus breaking the circuit through the auxiliary line 225.

For example, if lamp 70 should burn out solenoid 216 would be deenergized, and switch 217 would drop to open position. But said switch would thereupon connect up a circuit from the upper end of the shunt line 215 through the line 230 to the signal lamp 182.

If it should be desired to operate the machine for photographing only the lower surfaces of the documents, lamp 70 may be manually cut out by adjusting a switch 231 to open the circuit through shunt line 215 and bridging this open circuit through the line 235. The machine may then be operated, since current will continue to be supplied to maintain the energy of solenoid winding 210.

Similar manually adjustable switches are employed to cut out the shunt circuits through either of the lamps 71 or 185, since the electrical connections associated with these lamps are identical with those associated with the lamp 70, with the exception that interruption of the circuit of lamp 71 results in a shunt being automatically established through the signal lamp 183 and interruption of the circuit through the lamp 185 results in a shunt being automatically established through the signal lamp 186.

But except in cases where a break in the auxiliary line 225 may be manually bridged through line 235, any break in the auxiliary line 225 will automatically stop the motor.

The circuit through the auxiliary line 225 is broken by a switch 123 which connects up the circuit through the signal lamp 179, and it is similarly broken when the film tension switch 171 moves to connect up the signal lamp 172. In either case, interruption of the current through the auxiliary line 225 deenergizes the solenoid 210, and the motor circuit is automatically interrupted by the dropping of the relay switch 211 to its open position.

The turret actuating film driving electromagnetic clutch 107 is controlled by a shunt line 240 connected up by the switch arm 130 and electrode 132. When the electrode 132 contacts terminal 133, solenoid winding 241 is energized, thereby closing duplex switch 244 to the contacts 245 and 246. Current will then pass to the electromagnetic clutch through shunt line 247 and one leg of the switch 244. The circuit will be simultaneously connected in parallel through the other leg of the switch and the condenser 139. The presence of this condenser allows the circuit through the magnetic clutch to be momentarily interrupted without releasing the clutch, and therefore documents may be fed into the viewing chamber in spaced relation to each other without releasing the clutch if the cards follow each other in quick succession.

The metering wheel 150 and its signal lamp 156 are on the shunt line 255, as indicated in the diagram.

The electromagnetic counter 205 is controlled by shunt line 260 which includes the solenoid winding 261, which, when energized, operates a duplex switch 262 similar to the switch 244 associated with the electromagnetic clutch. But shunt line 260 has two legs or branches 265 and 266, and a solenoid switch 267 determines the branch through which the current will pass.

Switch 267 is electrically linked to switch 130 by line 268 which includes a solenoid winding 269, which, when energized, will lift switch 267 to the terminal 270 carried by the branch 266. Switch 267 is flexibly connected at 271 with the feed line 272, connected through one leg of switch 262 and the condenser 273 to the return side of the motor circuit.

Operation of the counter will be as follows:

Whenever switch 130 opens in the interval resulting from the spacing of infeeding documents, solenoid 269 is deenergized and switch 267 connects up the shunt line through the winding of solenoid 261, thereby lifting duplex switch 262 to disconnect the winding of the counter while maintaining the circuit through the condenser 273. When switch 130 closes in response to the entry of a succeeding card between the infeeding rollers of the viewing chamber, solenoid 269 will be energized, and switch 267 lifted to close the circuit through the branch line 266. Simultaneously the winding 261 will be deenergized and duplex switch 262 will drop to a position connecting this branch line 266 with the winding of the counter.

Due to the delay in the deenergization of this winding when switch 130 again opens, reciprocating movements of the counting mechanism may be sufficiently equalized in time to allow the counting mechanism to operate.

I claim:

1. The combination of a viewing chamber provided with a feedway for objects to be photographed and having opaque walls above and below the feedway, each provided with a viewing aperture, said apertures being offset in planes normal to the feedway and through which said objects may be progressively exposed, means within the viewing chamber for illuminating the exposed surfaces, and means for projecting images of the exposed surfaces upon a moving sensitized film in spaced relation to each other.

2. Equipment for simultaneously photographing the upper and lower surfaces of moving documents on a correspondingly moving motion picture film, comprising the combination of a viewing chamber provided with a feedway for the documents to be photographed, said chamber having screens above and below the feedway, each provided with an aperture offset from the other in a vertical plane, oppositely inclined oblique reflectors positioned to project images of the exposed upper and lower surfaces of objects moving along the feedway, and a camera having its lens positioned to receive such images.

3. Equipment for simultaneously photographing the upper and lower surfaces of moving objects on a correspondingly moving sensitized film, comprising the combination of a viewing chamber provided with a feedway for the objects to be photographed, said chamber having walls provided with viewing slots above and below the level of the feedway, reflectors positioned obliquely with reference to the feedway to project through said slots images of the upper and lower surfaces of objects moving along the feedway, a camera having its lens positioned to receive such images, and means for moving the film through the camera at a proportionate speed, one of said viewing slots being offset from the other along the feedway and the viewing chamber being provided with means for independently illuminating the portions of the object exposed through said slots.

4. Equipment for simultaneously photographing opposite surfaces of moving objects on a correspondingly moving motion picture film, comprising the combination of a viewing chamber provided with a feedway for the objects to be photographed, said chamber having means for progressively exposing narrow transverse and mutually offset zones of the surfaces of such objects at opposite sides of the feedway, obliquely placed reflectors positioned to project through said apertures images of the exposed surfaces, and a camera having its lens positioned to receive such images and adapted to progressively expose the moving film, means for illuminating the exposed portions of the object along lines which obliquely diverge from the rays illuminating the exposed portion of the opposite side of such object, whereby confusion of images is avoided.

5. Equipment for simultaneously photographing different surfaces of moving objects on a correspondingly moving film, comprising the combination of a viewing chamber provided with a feedway for the objects to be photographed, means for moving objects along said feedway, said chamber having mutually offset viewing apertures at opposite sides of the feedway, reflectors for projecting to a camera lens spaced images of objects exposed while in the feedway, and a revoluble carrier for auxiliary reflectors located between the image carrying light rays projected to the camera from said different surfaces.

6. Equipment for simultaneously photographing different surfaces of moving objects on a correspondingly moving sensitized film, comprising means for progressively moving and exposing mutually offset portions of the objects to be photographed and means for progressively moving and exposing a sensitized film in a position to receive images in spaced relation to each other of the simultaneously exposed portions of such objects, and auxiliary reflecting means operative for simultaneous projection of images into said space, between the first mentioned images.

7. Equipment for simultaneously photographing different surfaces of moving objects on a correspondingly moving sensitized film, comprising the combination of a viewing chamber having means for continuously supporting, moving and guiding objects to be photographed, said guiding and supporting means including obliquely disposed spaced supports spanning narrow gaps through which such objects may be progressively exposed, reflectors offset from each other and respectively positioned to project images of one of the exposed surfaces along spaced parallel lines as the objects move across said gaps, and a camera provided with film guiding mechanism and having its lens positioned to receive such images.

8. Equipment for simultaneously and progressively photographing different portions of the surfaces of a single moving object upon a correspondingly moving motion picture film, positioned to receive images of said surfaces in spaced relation to each other transversely of said film, in combination with means for illuminating non-registering portions of each surface by rays of light directed along lines which do not intersect the other illuminated surface, and movable means cooperative with said moving objects for photographically correlating in time the images of the different surfaces which are being simultaneously photographed.

9. The combination with a camera, of a motor having normally inoperative connections for continuously feeding film therethrough, a feedway for objects to be photographed, feed rollers operatively connected with the motor for moving objects along said feedway, feedway walls having transverse slots for exposing different portions of objects at different stages of their movement through the feedway, reflectors for projecting images of the exposed portions of such objects to the camera in transversely spaced relation to each other, a viewing chamber enclosing said feedway and reflectors and provided with slots offset from each other in positions to permit the reflected images to be respectively projected to the upper and lower portions of the camera, to produce transversely spaced paired photographs upon the film, and means for automatically operating the film driving connections from the motor during the passage of an object through the feedway.

10. The combination with a camera, of a motor having normally inoperative connections for continuously feeding film therethrough, a feedway for objects to be photographed, feed rollers operatively connected with the motor for moving objects along said feedway, feedway walls having transverse slots for exposing different portions of objects at different stages of their movement through the feedway, reflectors for projecting images of the exposed portions of such objects to the camera in transversely spaced relation to each other, a viewing chamber enclosing said feedway and reflectors and provided with slots offset from each other in positions to permit the reflected images to be respectively projected to the upper and lower portions of the camera to produce transversely spaced paired photographs upon the film, and photographic means for indicating on the film the time at which each pair of photographs is taken.

11. The combination with a camera, of a viewing chamber having a feedway for objects to be photographed and provided with top and bottom slots offset from each other along said feedway and through which objects moving along said feedway may be progressively exposed to the camera, feeding rollers for simultaneously advancing objects along the feedway and moving a film through the camera at a proportionate rate of speed to receive transversely spaced pairs of photographs of the surfaces of the objects as viewed through the respective slots, one of said feed rollers being annually channeled, a finger adapted to be movably supported by the moving members in a position to drop into the roller channel, and means associated with said finger for automatically interrupting the movement of the film in the absence from the field of an object to be photographed.

12. The combination with a camera, of a viewing chamber having a feedway for objects to be photographed and provided with upper and lower walls having non-registering slots through which objects moving along said feedway may be progressively exposed to the camera, means for simultaneously advancing objects along the feedway and moving a film through the camera at a proportionate rate of speed to receive transversely spaced pairs of photographs of the surfaces of the objects as viewed through the respective slots, means for progressively projecting to the film images of the upper and lower surfaces of an object in the feedway to produce said spaced pairs of photographs, and photographic means for automatically correlating photographs of each pair as having been produced from the same object.

13. In equipment for simultaneously photographing different surfaces of moving objects, a viewing chamber provided with a feedway for objects to be photographed, said viewing chamber having slots in one wall offset in parallel planes and on opposite sides of a plane which includes such objects when traveling along the feedway, and reflectors for projecting through said slots images of objects moving along the feedway.

14. In equipment for simultaneously photographing different surfaces of moving objects, the combination with a camera provided with film advancing mechanism, of a feedway provided with synchronized object advancing mechanism, a screen interposed between such objects and the lens and having exposure slots above and below the feedway and mutually offset in vertical planes, and reflectors for projecting through said slots to the upper and lower portions of the lens images of objects moving along the feedway.

15. Equipment for panoramically photographing opposite surfaces of documents upon a traveling motion picture film, comprising the combination of a viewing chamber provided with a feedway for the objects to be photographed, said chamber having means for progressively exposing narrow, transverse and mutually offset zones of the upper and lower surfaces of such documents in separately illuminated photographic fields, obliquely placed reflectors positioned to project light rays from such exposed surfaces along substantially parallel lines, a camera having its lens positioned to receive such light rays and provided with means for progressively exposing to them a moving sensitive film and having its lens positioned to receive said groups of light rays and direct them to the film for the production of images in spaced relation to each other, and cooperative means for indicating upon the film the relationship of such spaced photographs to each other and the time at which they were taken.

16. In a photographic recording machine having mechanism for advancing documents continuously and panoramically projecting images of the respective sides thereof to a correspondingly traveling moving picture film, the combination with the document advancing mechanism of a set of lamps for illuminating portions of the respective sides of the documents in different stages of advance, and screens for preventing such rays from intersecting the document in the direction of the illuminated portion of its opposite side.

17. In a panoramic machine for photographically recording pictures of both sides of traveling groups of documents upon a moving sensitized film and correlating all of the pictures in a group by intermittingly producing upon the film a photographic record of the time when the pictures were taken, the combination of a feedway for the documents, having opposing walls, said feedway being provided with transverse exposure slots, obliquely disposed reflectors of a width corresponding to said slots and positioned for projection of images along convergent lines, a camera positioned to receive such images, and a slotted screen between the reflectors and the camera, with its slots extending substantially at right angles to the slots in the feedway walls.

18. In a panoramic machine for recording images of traveling documents upon a continuously moving film, the combination of a feedway for the documents provided with narrow transversely extending exposure slots above and below the line of document travel, document guiding wires extending obliquely across said slots, means for illuminating the portions of the documents exposed through said slots and preventing rays of light from passing to the exposed surface on the opposite side of the document, and reflectors for directing images of the exposed portions of the documents to a camera.

19. The combination of a camera, mechanism for supporting and continuously feeding a series of objects to be photographed and progressively exposing their upper and lower surfaces to the camera lens, a motor for operating said mechanism and continuously feeding sensitized film to progressively expose the same to the camera lens, indexing devices, means driven by said motor for periodically projecting images of the indexing devices to said camera lens, illuminating lamps and associated alternatively acting signal lamps, film supply and receiving means, signal lamps controlled by the supply and receiving means, switch mechanism for interrupting the circuit of the motor simultaneously with the closing of a circuit through the first mentioned signal lamps, and separate switch mechanism for interrupting said circuit when document feeding ceases.

20. In a machine for photographing documents having differing obverse and reverse faces, the combination with document feeding means, of a feedway having opposing walls with exposure slots offset in the direction of document movement, means for illuminating the obverse and reverse faces of a document exposed by said slots, the offset of said slots preventing the transmission through the document to one of said slots of light falling on the opposite face of the document at the other of said slots, means for feeding a sensitized film in synchronism with document feed, and an optical system for directing to said film from the respective slots the light reflected from the obverse and reverse faces of the document.

21. In a machine for panoramically recording correlated images of the reverse and obverse sides of documents upon a film, the combination with means for advancing the documents in succession and continuously and correspondingly advancing the film, of means for projecting the images of the obverse and reverse faces of successive documents into laterally adjacent positions on successive longitudinal sections of the moving film, a stationary clock having dial means relatively fixed against bodily movement and means comprising a rectifying optical system synchronized with said means for film advance for intermittently projecting images of the clock to the successive sections of the film at intervals timed for association with images of each document in the group, said system including an optical member arranged to direct the image of the clock dial means to the same longitudinal section of said film to which said laterally adjacent images of a given document are projected, whereby the different pictures of the same document are correlated with each other and the images of the several documents are identified by the image of the clock dial means as pertaining to a single group.

22. In a device of the character described, the combination of a film guide and a record guide, said record guide being provided with offset exposure slots, means for illuminating the opposite faces of a record traversing said record guide, said guide including means for excluding such illumination from the record opposite the respective slots, whereby to preclude transillumination through the record toward said slots, a lens intervening between said film guide and record guide, means for propelling the film and record at corresponding rates along the respective guides past said lens, and means associated with the respective offset slots for projecting images of the obverse and reverse sides of the record through the lens to the same portions of the film at opposite sides of its longitudinal center line during such propulsion, said means comprising a plurality of optical systems supplementary to said lens having light receiving portions directed to the slotted portions of the record guide at opposite sides of the path of record travel.

ELGIN G. FASSEL.